Patented Apr. 6, 1943

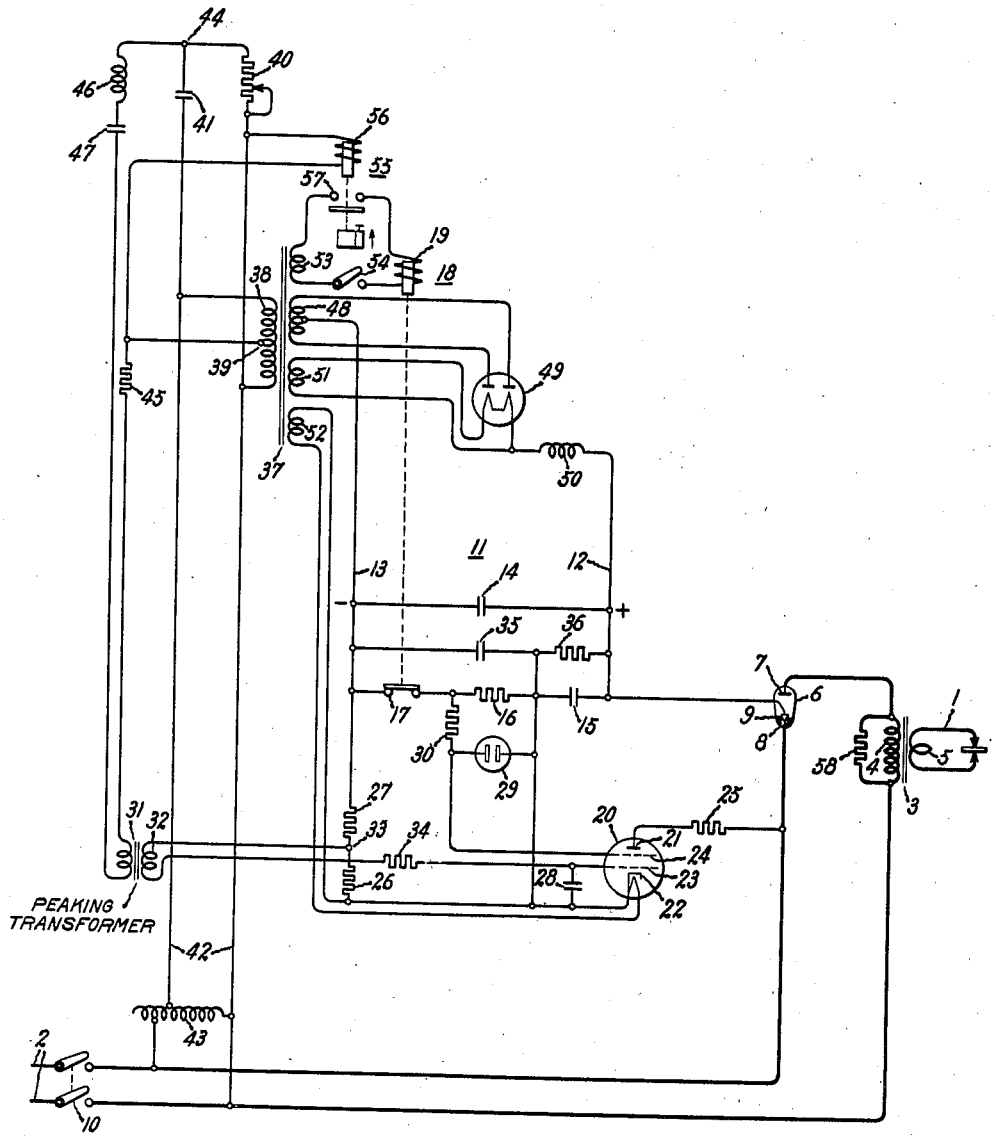

2,315,926

UNITED STATES PATENT OFFICE 2,315,926

ELECTRIC VALVE CIRCUIT

Maurice E. Bivens, Schenectady, N. Y., assignor to General Electric Company, a corporation of New York Application November 22, 1941, Serial No. 420,111

11 Claims. (Cl. 250—27)

My invention relates to electric valve circuits and more particularly to electric valve circuits which effect the transmission of a predetermined amount of current to a load circuit in response to a predetermined circuit controlling operation.

Electric valve means, such as electric valve apparatus employing ionizable mediums have been applied to industrial processes, such as electric resistance welding, because of the precision of control afforded by electrical equipment of this nature. In accordance with the teachings of my invention, I provide a new and improved electric control system wherein a greater degree of precision of operation in the control of electric valve apparatus is obtainable than that afforded by the prior art arrangements.

It is an object of my invention to provide a new and improved electric control system.

It is another object of my invention to provide a new and improved electric valve translating system.

It is a further object of my invention to provide a new and improved electric valve control system wherein an accurately determinable amount of current, such as an impulse of current of predetermined magnitude, is transmitted to a load circuit, such as a welding circuit, from an alternating current supply circuit in response to a predetermined circuit controlling operation.

Briefly stated, in the illustrated embodiment of my invention I provide a new and improved control circuit as applied to electric valve translating apparatus such as that employed to control the amount of current transmitted to a load circuit, such as a welding circuit. More particularly, my invention is illustrated as applied to an electric control system which effects the transmission of a single impulse of welding current to the welding circuit in response to a predetermined circuit controlling operation, such as the operation of a manually or automatically controlled switch. Precise control of the amount of current transmitted to the load circuit is obtained by employing a control circuit using an electric discharge device having control means such as two control members or grids. A hold-off voltage is impressed on one of the grids and another voltage, such as a voltage of peaked wave form, is impressed on the other grid. Removal of the hold-off voltage renders the voltage of peaked wave form effective so that the initiation of operation of the control circuit is effected at a precise time during the voltage of the supply circuit, thereby effecting the transmission of a precise amount of current to the load circuit.

For a better understanding of my invention, reference may be had to the following description taken in connection with the accompanying drawing, and its scope will be pointed out in the appended claims. The single figure of the drawing represents an embodiment of my invention as applied to a half-cycle electric resistance welding system employing electric discharge apparatus.

Referring now to the single figure of the drawing, my invention is there diagrammatically illustrated as applied to an electric translating system for energizing a load circuit, such as a welding circuit 1, from an alternating current supply circuit 2 through translating apparatus comprising a transformer 3 having a primary winding 4 and a secondary winding 5. The translating apparatus also may include electric valve means 6 which may be of the type employing an ionizable medium and comprising an anode 7, a cathode 8, and a control member 9. The control member 9 may be of the immersion-ignitor type constructed of a material such as boron carbide or silicon carbide having an electrical resistivity which is large compared with that of the associated mercury pool cathode, and which requires the transmission of a predetermined minimum amount of current therethrough in order to initiate an arc discharge between the anode and the cathode. A switch or circuit breaker 10 may be connected between the supply circuit 2 and the translating apparatus, if desired.

In order to transmit to the control member 9 an impulse of current at an accurately determinable time during a positive half cycle of anode-cathode voltage applied to electric valve means 6 and to thereby control accurately the amount of current transmitted to the welding circuit 1, I provide an excitation circuit 11. The excitation circuit 11 includes a source of direct current including a positive conductor 12 and a negative conductor 13. A filtering capacitance 14 may be connected across the terminals 12 and 13 in order to absorb the ripple voltage present in the output voltage of the bi-phase rectifier described hereinafter. I employ a capacitance 15 which is connected to be charged from the source of direct current and which may be included as an element of a voltage divider connected across the source of direct current. The voltage divider may include an impedance element, such as a resistance 16, and a circuit controlling means or a switch 17. The circuit controlling means or switch 17 may be an element of a relay 18 which, in turn, is controlled by other apparatus described hereinafter, and may comprise an actuating coil 19. The capacitance 15 is discharged through the control member 9 of electric valve means 6 by means of an electric discharge device 20 which is also preferably of the type employing an ionizable medium, such as a gas or a vapor, and includes an anode 21, a cathode 22 and control means such as a pair of control electrodes or grids 23 and 24 which conjointly control the conductivity of the electric discharge device. The discharge path for the capacitance 15 includes immersion-ignitor control member 9, a resistance 25, and the anode-cathode circuit of the electric discharge device 20. A suitable transient absorbing capacitance 28 may be connected between the cathode 22 and control grid 23.

I provide means energized from the source of direct current and more particularly connected across the terminals of resistance 16 to impress a negative biasing potential or hold-off potential on the grid 24 of electric discharge device 20. This means may comprise a suitable constant voltage device, such as a glow discharge valve 29, and a resistance 30, the former being connected directly across the cathode 22 and the grid 24. The magnitude of the hold-off voltage impressed on grid 24 is sufficient to maintain the electric discharge device 20 nonconducting irrespective of the magnitude of the voltage impressed on the grid 23.

A suitable control voltage, such as a voltage of peaked wave form, is impressed on control grid 23 of electric discharge device 20 by means of a peaking transformer 31. Secondary winding 32 of peaking transformer 31 is connected between the common juncture 33 of resistances 26 and 27 and the grid 23 of discharge device 20 through a resistance 34. When the negative or hold-off potential is removed from grid 24 by the opening of switch 17, the voltage of peaked wave form becomes effective to render the electric discharge device 20 conducting.

As a means for rendering the electric discharge device 20 nonconducting after the discharge of capacitance 15, I provide a second capacitance 35 which may be connected as an element of a voltage divider across the source of direct current in series relation with a resistance 36 to impress on the control grid 23 a negative unidirectional biasing potential which remains effective until the closure of the switch 17. The capacitance 35, it will be noted, is connected in circuit with control grid 23 and the cathode 22 of the discharge device 20. Upon discharge of the capacitance 15, the capacitance 35 is charged to raise the potential of the cathode 22 or, in other words, to lower the potential of the grid 23, thereby rendering the electric discharge device 20 nonconducting.

To control the phase of the voltage supplied to the peaking transformer 31, I employ a suitable arrangement, such as a transformer 37, having a primary winding 38 provided with an intermediate connection 39. A static impedance type phase shifting circuit, including a variable resistance 40 in one branch and a capacitance 41 in the other branch, may be connected to be energized from circuit 42 which, in turn, is connected to the supply circuit 2 through an auto-transformer 43. A common juncture 44 of resistance 40 and capacitance 41 and the intermediate connection 39 are connected to the primary winding of the peaking transformer 31 and provide an alternating voltage variable or adjustable in phase with respect to the voltage of the supply circuit 2. A current limiting resistance 45 may be employed and suitable filtering means, such as an inductance 46 and a capacitance 47, may be connected in series relation with the primary winding of the peaking transformer 31.

Transformer 37 is also provided with a secondary winding 48 which cooperates with a rectifier 49 to supply a unidirectional current to conductors 12 and 13. A smoothing inductance 50 may be connected in series relation with the output of the bi-phase rectifier. Secondary windings 51 and 52 are employed as sources of filament heating current for the rectifier 49 and electric discharge device 20.

Transformer 37 is also provided with a secondary winding 53 which serves to energize the actuating coil 19 of relay 18 in response to the closure of a manually operable switch 54. A time delay relay 55 is connected to prevent initiation or operation of the system until a predetermined interval of time after the application of cathode heating current to the filaments of the electric discharge apparatus, in order that the temperatures of the cathodes may assume a safe operating value. This time delay may be obtained by connecting the actuating coil 56 of time delay relay 55 to be energized upon closure of the circuit breaker 10 through transformer 43 and circuit 42. Contacts 57 of relay 55 close with a predetermined time delay so that, even though the switch 54 is closed immediately after, or simultaneously with, the circuit breaker 10, the operation of the system will not be initiated until the contacts 57 are closed.

If desired, a voltage limiting means, such as a resistance 58, may be connected across the primary winding 4 of transformer 3 to protect the translating apparatus. This resistance also provides a path for the dissipation of residual stored electromagnetic energy due to the flux in the core member of transformer 3.

The operation of the embodiment of my invention illustrated in the drawing will be explained by considering the system when it is intended to operate as a half-cycle welder, that is, when it is intended to transmit a half-cycle or a predetermined portion of a half-cycle of current to the welding circuit 1 in response to a single circuit controlling operation.

The system, of course, is placed in operation by closing the circuit breaker 10 and after the expiration of a predetermined interval of time, the contacts 57 of relay 55 will be closed so that upon subsequent operation of the switch 54 the transmission of welding current to the welding circuit 1 is effected.

Capacitance 15 is charged from the source of direct current including conductors 12 and 13, the circuit for capacitance 15 being completed through resistance 16 and switch 17. The capacitance 15 is not discharged due to the fact that a negative or hold-off voltage is impressed on control grid 24 of the electric discharge device 20. It will be noted that the grid 24 is connected to the negative terminal or conductor 13 of the source of direct current. The magnitude of this voltage is sufficient to maintain the discharge device 20 nonconducting so long as the potential is applied to the grid. A voltage of peaked wave form is applied to control grid 23 but is of a value which is insufficient in itself to overcome the effect of the hold-off voltage. The phase of the voltage of peaked wave form impressed on grid 23 with respect to the voltage of supply circuit 2 may be controlled or adjusted by means of the phase shifting circuit, and more particularly by adjustment of the variable resistance 40.

The transmission of current to the welding circuit 1 may be effected by closure of switch 54 which effects energization of the actuating coil 19 from secondary winding 53. Since relay 55 has closed its contacts 57, switch 17 is opened, thereby removing the hold-off potential from grid 24. The electric discharge device 20 will be rendered conducting at the time determined by the phase position of the voltage of peaked wave form provided by transformer 31. It will be noted that secondary winding 32 of transformer 31 is also connected to the negative conductor 13 of the source of direct current. Upon occurrence of the next positive cycle of voltage of peaked wave form after the opening of switch 17, the electric discharge device 20 is rendered conducting, effecting discharge of capacitance 15 through control member 9, resistance 25, and the anode-cathode circuit of discharge device 20. The discharge of the capacitance 15 charges the capacitance 35, thereby preventing a continuous flow of current through the control member 9 from the direct current source. Resistance 25 limits the discharge current, and the high resistance direct current path provided by resistances 26 and 27 across capacitance 35 prevents capacitance 15 from recharging appreciably. Resistances 26 and 27 are designed to have relatively large ohmic values compared with resistance 36. The charging of capacitance 35, which is connected in circuit with cathode 22 and grid 23, serves to render the discharge device 20 nonconducting and the negative voltage provided by capacitance 35 remains effective until switch 17 is closed. Of course, switch 17 is closed upon opening of switch 54. Upon closure of switch 17, the capacitance 35 discharges through resistance 16 and the capacitance 15 is recharged, thereby resetting the system for a subsequent operation.

The magnitude of the current transmitted to the welding circuit is, of course, determinable or controllable by adjustment of the phase relationship of the voltage of peaked wave form produced by transformer 31 relative to the voltage of supply circuit 2. It will be understood that as the electric valve means 6 is rendered conducting for greater portions of the positive half-cycles of applied anode-cathode voltage, the amount or average value of current transmitted to the welding circuit 1 is increased, and that as the portions of the positive half-cycles of voltage during which the electric valve means is conductive are decreased, the amount of current transmitted to the welding circuit is correspondingly decreased. Therefore, by adjusting the phase position of the voltage of peaked wave form, the initiation of the discharge of the capacitance 15 during the positive half-cycles of voltage of the supply circuit 2 is accurately controllable, affording a highly satisfactory way of controlling the current. Furthermore, by the use of a separate hold-off voltage impressed on a separate grid, the operation of the control circuit is more precise than that obtained by attempting to impress both the hold-off voltage and the firing voltage on the same grid.

While I have shown and described my invention as applied to a particular system of connections and as embodying various devices diagrammatically shown, it will be obvious to those skilled in the art that changes and modifications may be made without departing from my invention, and I, therefore, aim in the appended claims to cover all such changes and modifications as fall within the true spirit and scope of the my invention.

What I claim as new and desire to secure by Letters Patent of the United States is:

1. In combination, an alternating current supply circuit, a load circuit, electric translating apparatus connected between said circuits and including electric valve means having a control member, excitation means for transmitting an impulse of current to said control member and comprising a capacitance, means for charging said capacitance, means for discharging said capacitance and including an electric discharge device having an anode, a cathode and a pair of control electrodes, means for impressing on one of said control electrodes a voltage tending to maintain said discharge device nonconductive, means for impressing on the other control electrode a voltage of peaked wave form the magnitude of which is insufficient to render said discharge device conducting when said hold-off voltage is effective, and means for initiating conduction by said electric discharge device and for initiating energization of said load circuit comprising means for modifying said hold-off potential and for permitting said peaked voltage to render said discharge device conducting at the time determined by the phase relation of said peaked voltage relative to the voltage of said supply circuit.

2. In combination, an alternating current supply circuit, a load circuit, electric translating apparatus connected between said circuits and including electric valve means having a control member, excitation means for transmitting an impulse of current to said control member and comprising a capacitance, means for charging said capacitance, means for discharging said capacitance and including an electric discharge device having an anode, a cathode and a pair of control electrodes, means for impressing on one of said control electrodes a voltage tending to maintain said discharge device nonconductive, means for impressing on the other control electrode a voltage of peaked wave form the magnitude of which is insufficient to render said discharge device conducting when said hold-off voltage is effective, means connected in circuit with said capacitance and said one control member for initiating conduction by said electric discharge device comprising means for removing said hold-off voltage from said one control electrode for initiating conduction by said discharge device, and means for rendering said electric discharge device nonconducting upon discharge of said capacitance.

3. In combination, an alternating current supply circuit, a load circuit, electric translating apparatus connected between said circuits and including electric valve means having a control member, excitation means for transmitting an impulse of current to said control member and comprising a capacitance, means for charging said capacitance, means for discharging said capacitance and including an electric discharge device having an anode, a cathode and a pair of control electrodes, means for impressing on one of said control electrodes a voltage tending to maintain said discharge device nonconductive, means for impressing on the other control electrode a voltage of peaked wave form the magnitude of which is insufficient to render said discharge device conducting when said hold-off voltage is effective, means connected in circuit with said capacitance and said one control member for initiating conduction by said electric discharge device comprising means for removing said hold-off potential and for transmitting said peaked voltage to render said discharge device conducting, and means for rendering said electric discharge device nonconducting after discharge of said capacitance comprising a second capacitance connected to be charged during the discharge period of the first mentioned capacitance.

4. In combination, an electric discharge device having an anode, a cathode and a pair of grids, a capacitance, a source of direct current for charging said capacitance, a voltage divider connected across said source for impressing a negative hold-off potential on one of said grids, means for impressing on the other of said grids a voltage sufficient to render said electric discharge device conducting but being of a magnitude insufficient in itself to overcome the effect of said hold-off potential, and initiating means connected in circuit with said capacitance and said one grid for removing said hold-off potential from said one of said grids and for permitting the voltage impressed on said other grid to render said electric discharge device conducting.

5. In combination, an electric discharge device having an anode, a cathode and a pair of grids, a capacitance, a source of direct current for charging said capacitance, a voltage divider connected across said source for impressing a negative hold-off potential on one of said grids, means for impressing on the other of said grids a voltage sufficient to render said electric discharge device conducting but being of a magnitude insufficient in itself to overcome the effect of said hold-off potential, means for discharging said capacitance comprising means connected in circuit with said capacitance and one of said grids for removing said hold-off potential from said one grid, and means responsive to the discharge of said capacitance for impressing a biasing potential on said other grid after discharge of said capacitance.

6. In combination, an electric discharge device having an anode, a cathode and a pair of grids, a capacitance, a source of direct current for charging said capacitance, a voltage divider connected across said source for impressing a negative hold-off potential on one of said grids, means for impressing on the other of said grids a voltage sufficient to render said electric discharge device conducting but being of a magnitude insufficient in itself to overcome the effect of said hold-off potential, means for discharging said capacitance comprising means for raising the potential of said one grid, and means for impressing a negative biasing potential on said other grid after discharge of said capacitance and comprising a second capacitance which is charged from the first mentioned capacitance.

7. In combination, an alternating current supply circuit, a load circuit, electric translating apparatus connected between said circuits and comprising an electric valve means having a control member, a source of direct current, a voltage divider connected across said source and comprising a capacitance and a switching means, means for discharging said capacitance through said control member and comprising an electric discharge device having an anode, a cathode and a pair of control grids, means for impressing on one of said grids a hold-off potential derived from said voltage divider, and means for impressing on the other of said grids a voltage tending to render said discharge device conducting but being of a magnitude insufficient to overcome the effect of said hold-off potential, and switching means when in the open-circuit position effectively removing the hold-off potential from said one grid thereby permitting said other grid to render said discharge device conducting and causing the discharge of said capacitance through said control member.

8. In combination, an alternating current supply circuit, a load circuit, electric translating apparatus connected between said circuits and including electric valve means having a control member, a source of direct current, a voltage divider connected across said source and including in series relation a switching means, a resistance and a capacitance, said capacitance being connected to be charged from said source through said switching means and said resistance, means comprising an electric discharge device for discharging said capacitance through said control member, said electric discharge device comprising an anode, a cathode and two control grids, means connected to said voltage divider for impressing a negative hold-off potential on one of said grids and comprising a glow discharge device connected across said one grid and said cathode, means for impressing on the other grid a voltage of peaked wave form tending to render said electric discharge device conducting but being of a magnitude insufficient to overcome the effect of said hold-off potential, said switching means when in the open-circuit position effecting removal of said hold-off potential from said one grid and thereby permitting said peaked voltage to render said discharge device conducting and causing discharge of said capacitance through said control member, and means for rendering said discharge device nonconducting after discharge of said capacitance and comprising a second capacitance in circuit with said other control grid and said cathode and connected to be charged upon discharge of the first mentioned capacitance.

9. In combination, a source of direct current, a capacitance connected to be charged from said source, means for discharging said capacitance comprising an electric discharge device having an anode, a cathode and a pair of control grids, means connected to said source for impressing a biasing potential on one of said grids, means for impressing on the other of said grids a voltage tending to render said discharge device conducting but of a magnitude insufficient to overcome the effect of said biasing potential, means for removing said biasing potential to effect discharge of said capacitance, and means for rendering said electric discharge device nonconducting comprising a second capacitance connected in circuit with said cathode and said other grid.

10. In combination, a source of current, a capacitance connected to be charged from said source, means for discharging said capacitance comprising an electric discharge device having an anode, a cathode and a control means, means for impressing a negative hold-off voltage on said control means, means for impressing on said control means a voltage tending to render said discharge device conducting but of a magnitude insufficient to overcome the effect of said biasing potential, means for modifying said biasing potential to effect discharge of said capacitance, and means comprising a second capacitance responsive to the discharge of the first mentioned capacitance for impressing a negative potential on said control means to control the period during which said electric discharge device is conductive.

11. In combination, a source of current, a capacitance connected to be charged from said source, means for discharging said capacitance comprising an electric discharge device having an anode, a cathode and a control means, means connected to said source for impressing a negative hold-off voltage on said control means, means for impressing on said control means a voltage tending to render said discharge device conducting but of a magnitude insufficient to overcome the effect of said biasing potential, means for modifying said biasing potential to effect discharge of said capacitance, and means comprising a second capacitance connected to be charged by the first mentioned capacitance for impressing a biasing potential on said control means and for controlling the period during which said discharge device is in a conductive condition.

MAURICE E. BIVENS.